United States Patent
Hara

[19]

[11] Patent Number: 6,035,019
[45] Date of Patent: *Mar. 7, 2000

[54] COMMUNICATION CONTROL DEVICE WHICH CONVERTS MODEM COMMANDS INTO TELEPHONE CONTROL FUNCTION TO COMMUNICATE AND COMMAND CONVERSION METHOD THEREOF

[75] Inventor: Minori Hara, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,369

[22] Filed: Jun. 24, 1997

[30] Foreign Application Priority Data

Jun. 24, 1996 [JP] Japan ................................ 8-182846

[51] Int. Cl.$^7$ ................................................. H04M 11/00
[52] U.S. Cl. ..................................... 379/93.05; 379/93.08; 379/93.31
[58] Field of Search ............................. 379/93.01, 93.05, 379/93.08, 93.28, 93.31

[56] References Cited

U.S. PATENT DOCUMENTS 5,574,888  11/1996  Panditji .................................. 395/500
5,675,831  10/1997  Caputo .................................... 395/830

FOREIGN PATENT DOCUMENTS 4-299633  10/1992  Japan .

*Primary Examiner*—Paul Loomis
*Assistant Examiner*—Melur Ramakrishnaiah
*Attorney, Agent, or Firm*—Sughrue, Mion, Zinn, Macpeak & Seas, PLLC

[57] ABSTRACT

A communication control device including an analog modem control unit for outputting a control command for controlling an analog line modem, a communication control unit for controlling a communication platform conformed to a standard interface of a telephone control function, a command conversion driver for receiving input of a control command output from the analog modem control unit and converting the command into that of format conformed to a telephone control function used at the communication control unit, and a function executing unit for calling a telephone control function in response to a command whose format is converted by the command conversion driver to control a communication platform.

8 Claims, 2 Drawing Sheets

COMMUNICATION CONTROL DEVICE WHICH CONVERTS MODEM COMMANDS INTO TELEPHONE CONTROL FUNCTION TO COMMUNICATE AND COMMAND CONVERSION METHOD THEREOF

BACKGROUND OF THE INVENTION

1. FIELD OF THE INVENTION

The present invention relates to a communication control device which converts modem commands for controlling an analog line modem connected to an information processor into commands conformed to a telephone control function, which is used for the utilization of a digital multifunctional telephone line and other various lines, to conduct various communication using the telephone control functions, and a command conversion method thereof.

2. DESCRIPTION OF THE RELATED ART

For realizing program environments conformed to a standard interface of a telephone control function such as TAPI (Telephony Application Programming Interface) on information processors including a personal computer and a workstation, the information processors need to introduce and employ software developed exclusively for the standard interface. Such software developed exclusively for a standard interface, however, is not allowed to employ modem commands such as AT commands and V.25bis commands which are control commands for use in general-purpose communication software for controlling common analog line modems.

Conventional information processors therefore have drawbacks that they are not allowed to use general-purpose communication software which issues modem commands associated with an analog line modem to utilize various kinds of communication platforms conformed to a telephone control function for use in utilizing a digital multifunctional telephone line and other various lines.

One of conventional art aimed at utilizing a desired communication format by controlling a communication control device conformed to a specific communication format by means of a general-purpose communication software is disclosed in Japanese Patent Laying Open No. 4-299633, entitled "Personal Computer". The literature recites a personal computer provided with a conversion CPU for converting AT commands into control commands of a teleterminal communication control device for the purpose of controlling the teleterminal communication control device by means of communication software using general-purpose AT commands to enable communication through a terminal network.

The conventional art recited in the above literature, however, has a shortcoming that since the communication commands are converted into commands of desired communication format by the provided conversion CPU, the personal computer is not widely applicable, without modification, to various kinds of communication platforms. In other words, the conventional information processor requires too much labor and time to be efficient because the conversion CPU should be replaced every time the type of communication platform to be used is changed and because a plurality of conversion CPU should be mounted to cope with a plurality of kinds of communication platforms.

SUMMARY OF THE INVENTION

An object of the present invention is to provide a communication control device which uses general-purpose communication software to conduct the same operation as that of an analog line modem, thereby enabling utilization of communication environments conformed to telephone control functions including TAPI, and a command conversion method therefor.

Another object of the present invention is to provide a communication control device which is allowed to utilize various kinds of communication environments conformed to telephone control functions including TAPI to enable drastic improvement of facility of communication software, and a command conversion method therefor.

Still another object of the present invention is to provide a communication control device which realizes a command format conversion function by software and utilizes a standard interface of a telephone control function to increase its versatility to be applied to various communication platforms with ease, and a command conversion method therefor.

According to the first aspect of the invention, a communication control device which controls communication environments conformed to a standard interface of a telephone control function by using control commands for controlling an analog line modem, comprises analog modem controlling means for outputting a control command for controlling an analog line modem, communication controlling means for controlling a communication platform conformed to a standard interface of a telephone control function, command converting means for receiving input of a control command output from said analog modem controlling means and converting the command into that of format conformed to the telephone control function used in said communication controlling means, and function executing means for calling said telephone control function in response to the command whose format is converted by said command converting means to control said communication platform.

In the preferred construction, upon receiving input of said control command output from said analog modem controlling means, said command converting means checks existence/non-existence of a function equivalent to the function required by the control command among the functions provided by said telephone control function and when the equivalent function exists, converts the format of the control command into that conformed to said telephone control function and sends the converted command to said function executing means.

The telephone control function used at said communication controlling means may be a telephony application programming interface.

In the preferred construction, the telephone control function used at said communication controlling means is a telephony application programming interface, and upon receiving input of said control command output from said analog modem controlling means, said command converting means checks existence/non-existence of a function equivalent to the function required by the control command among the functions provided by said telephony application programming interface and when the equivalent function exists, converts the format of the control command into that conformed to said telephony application programming interface and sends the converted command to said function executing means.

According to the second aspect of the invention, a communication controlling method of controlling communication environments conformed to a standard interface of a telephone control function by using a control command for controlling an analog line modem, comprising the steps of
generating a control command for controlling an analog line modem,
converting the control command generated at said control command generating step into a command of format conformed to said telephone control function, and
calling said telephone control function in response to the command whose format is converted at said command format converting step to control a communication platform conformed to a standard interface of said telephone control function.

In this case, said command format converting step comprises the steps of:
upon receiving input of said control command output from said analog modem controlling means, checking existence/non-existence of a function equivalent to the function required by the control command among the functions provided by said telephone control function, and when the equivalent function exists, converting the format of the control command into that conformed to said telephone control function and sending the converted command to said function executing means.

According to a further aspect of the invention, a computer readable memory storing a control program in a communication control device which controls communication environments conformed to a standard interface of a telephone control function by using a control command for controlling an analog line modem, said control program comprises the steps of:
generating a control command for controlling an analog line modem,
converting the control command generated at said control command generating step into a command of format conformed to said telephone control function, and
calling said telephone control function in response to the command whose format is converted at said command format converting step to control a communication platform conformed to a standard interface of said telephone control function.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention.

Figure 1:
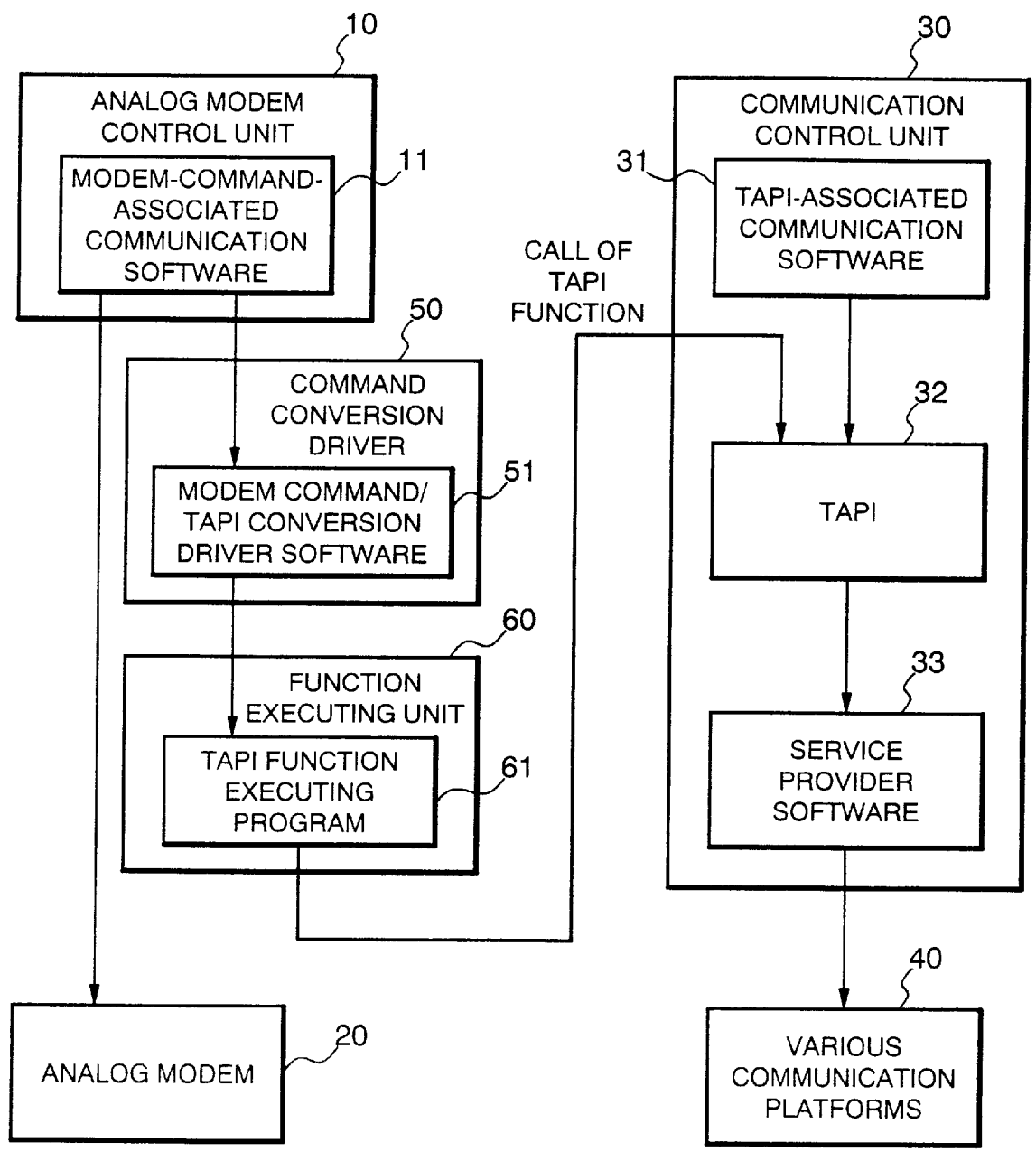
FIG. 1 is a block diagram showing structure of a communication control device according to one embodiment of the present invention.

FIG. 1 is a block diagram showing structure of a communication control device according to one embodiment of the present invention.

With reference to FIG. 1, the communication control device of the present embodiment includes an analog modem control unit 10 for controlling an analog line modem 20 to communicate through an analog line, a communication control unit 30 for controlling various communication platforms 40 to conduct communication conformed to a telephone control function, a command conversion driver 50 for converting a command issued from the analog modem control unit 10 into a command of format conformed to a telephone control function, and a function executing unit 60 for calling the telephone control function of the communication control unit 30 in response to the command converted by the command conversion driver 50 to control the communication platform 40. In this embodiment, used as a telephone control function is a TAPI, which is an API on an operating system, as will be described later. It is apparent that the present embodiment is also applicable to a case where other various kinds of telephone control functions are used. In FIG. 1, illustration is made only of a characteristic part of the structure of the present embodiment and that of the remaining common part is omitted.

In the above-described structure, the analog modem control unit 10 is implemented, similarly to conventional art, by a CPU controlled by a general-purpose communication software 11 associated with an analog line modem and a storage medium such as a RAM or a magnetic disk device which stores the communication software 11. Under the control of the communication software 11, the analog modem control unit 10 issues modem commands such as an AT command and a V.25bis command. Issued commands are ordinarily sent to the analog modem 20 connected to a serial port (e.g. RS-232C port) of an information processor to control operation of the analog modem 20.

The communication control unit 30 is implemented, similarly to conventional art, by a CPU controlled by a dedicated communication software 31 conformed to the specification of a TAPI 32, and a service provider software 33 associated with the communication platform 40, and a storage means such as a RAM or a magnetic disk device which stores these software. The communication control unit 30 calls a function of the TAPI 32 to operate under the control of the communication software 31. The unit 30 also provides data formats conformed to various kinds of the communication platforms 40 including a digital multifunctional telephone under the control of the service provider software 33 located at a lower layer of the TAPI 32.

The command conversion driver 50 is implemented by a CPU controlled by a modem command/TAPI conversion driver software 51, and a storage means such as a RAM or a magnetic disk device which stores the modem command/TAPI conversion driver software 51. The command conversion driver 50 receives input of a modem command output from the analog modem control unit 10, and converts the format of the modem command into a format conformed to the TAPI function and sends the converted modem command to the function executing unit 60 under the control of the modem command/TAPI conversion driver software 51.

The command conversion driver 50 is provided with a command buffer for use in converting a command, though it is not shown.

The function executing unit 60 is implemented by a CPU controlled by a TAPI function executing program 61, and a storage means such as a RAM or a magnetic disk device which stores the TAPI function executing program 61. The function executing unit 60, under the control of the TAPI function executing program 61, calls and executes a function of the TAPI 32 of the communication control unit 30 as required in response to a command received from the command conversion driver 50. This enables use of the function of the TAPI 32 in completely the same manner as in a case where the communication control unit 30 calls and executes the function of the TAPI 32 under the control of the communication software 31.

In the above-described structure, the software 11, 31, 32 and 33, 51, and 61 respectively implementing the analog modem control unit 10, the communication control unit 30, the command conversion driver 50 and the function executing unit 60 are provided in storage media such as a magnetic disk and a semiconductor memory. Read of these programs into the internal memory to control the CPU leads to implementation of the respective function executing units.

Figure 2:
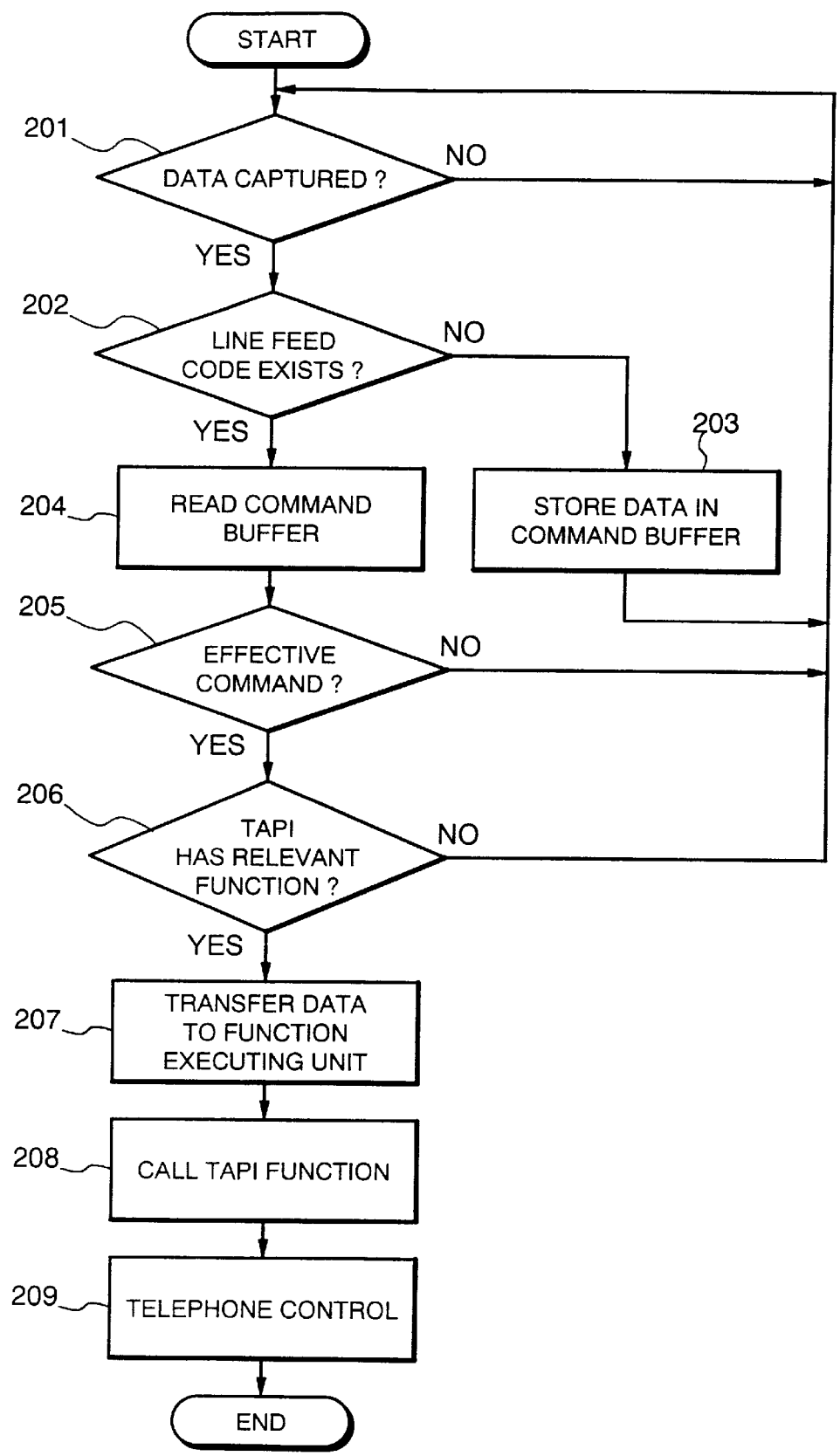
FIG. 2 is a flow chart showing operation of a command conversion driver and a function executing unit of the present embodiment.

Operation of the command conversion driver 50 and the function executing unit 60 of the present embodiment will be described with reference to the flow chart shown in FIG. 2.

When capturing command data output from the analog modem control unit 10, the command conversion driver 50 checks existence/non-existence of a line feed code in the command data (Steps 201 and 202). When no line feed code exists, the driver 50 stores the command data in the command buffer (Step 203) and returns to Step 201 to wait for subsequent command data to be captured. On the other hand, when a line feed code exists in the command data, the driver 50 determines that the corresponding modem command is completed to read all the command data stored in the command buffer (Step 204).

Next, the command conversion driver 50 determines whether a command string read from the command buffer is an effective modem command or not (Step 205). When it is an effective modem command, the driver 50 further determines whether the TAPI 32 has a relevant function (Step 206). When the determination is made that the TAPI 32 has the relevant function, the driver converts the corresponding command data into that of format associated with the TAPI 32 and transfers the converted data to the function executing unit 60 (Step 207).

The function executing unit 60 then calls a function of the TAPI 32 similarly to the operation of the communication control unit 30 under the control of the communication software 31 and requests the communication platform 40 for a telephone function associated with the modem command under the control of the service provider software 33 (Step 208). As a result, telephone control by the communication platform 40 is realized (Step 209).

When the determination is made at Step 205 that the command string is not an effective modem command or when the determination is made at Step 206 that the TAPI 32 has no relevant function, the function of the TAPI 32 is not executed and the command conversion driver 50 returns to Step 201 to wait for subsequent command data to be captured. When there exists a substitute function which complements the function required by the modem command in the TAPI 32, the substitute function may be executed.

As described in the foregoing, the communication control device and the command conversion method therefor of the present invention have an advantage that since software used on an information processor by a user is general-purpose communication software associated with a conventional analog modem, environments conformed to TAPI and other telephone control functions are available by the same operation as that of an analog line modem.

In addition, since communication environments available under the control of general-purpose communication software are not limited to analog lines via a modem but available for various communication conformed to TAPI and other telephone control functions, facility of the communication software is drastically improved.

Further effect is that implementation of a command format conversion function by software and use of a standard interface of a telephone control function allow the communication control device to increase its versatility and to be applied to various communication platforms with ease.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication control device which controls communication environments conformed to a standard interface of a telephone control function by using control commands for controlling an analog line modem, comprising:

analog modem controlling means for outputting a control command of said control commands for controlling said analog line modem;

communication controlling means for controlling a communication platform conformed to a standard interface of a telephone control function;

command converting means for receiving, as an input, said control command output from said analog modem controlling means, and converting the command into that of a format conformed to the telephone control function used in said communication controlling means;

function executing means for calling said communication controlling means to perform said telephone control function in response to the command converted by said command converting means;

said analog modem controlling means providing one of said control commands directly to said analog line modem; and said analog line modem receiving no output from said command converting means and no output from said function executing means;

wherein said command converting means comprises only software.

2. The communication control device as set forth in claim 1, wherein upon receiving input of said control command output from said analog modem controlling means, said command converting means checks existence/non-existence of a function equivalent to the function required by the control command among the functions provided by said telephone control function and when the equivalent function exists, converts the format of the control command into that conformed to said telephone control function and sends the converted command to said function executing means.

3. The communication control device as set forth in claim 1, wherein the telephone control function used at said communication controlling means is a telephony application programming interface.

4. The communication control device as set forth in claim 1, wherein the telephone control function used at said communication controlling means is a telephony application programming interface, and upon receiving input of said control command output from said analog modem controlling means, said command converting means checks existence/non-existence of a function equivalent to the function required by the control command among the functions provided by said telephony application programming interface and when the equivalent function exists, converts the format of the control command into that conformed to said telephony.

5. A communication controlling method of controlling communication environments conformed to a standard interface of a telephone control function by using a control command for controlling an analog line modem, comprising the steps of:

generating a control command for controlling an analog line modem;

determining whether said control command is an effective modem command to provide a modem command determination;

when said determination is that said control command is said effective modem command, converting, using software, the control command generated at said control command generating step into a command of format conformed to said telephone control function; and calling said telephone control function in response to the command whose format is converted at said command format converting step to control a communication platform conformed to a standard interface of said telephone control function;

wherein said command of said format conformed to said telephone control function is not output to said analog line modem.

6. The communication controlling method as set forth in claim 5, wherein said command format converting step comprises the steps of:

upon receiving input of said control command output from said analog modem controlling means, checking existence/non-existence of a function equivalent to the function required by the control command among the functions provided by said telephone control function, and when the equivalent function exists, converting the format of the control command into that conformed to said telephone control function and sending the converted command to said function executing means.

7. A computer readable memory storing a control program in a communication control device which controls communication environments conformed to a standard interface of a telephone control function by using a control command for controlling an analog line modem, said control program comprising software instructions for enabling a CPU to perform the steps of:

generating a control command for controlling an analog line modem;

determining whether said control command is an effective modem command to provide a modem command determination;

when said determination is that said control command is said effective modem command, converting the control command generated at said control command generating step into a command of format conformed to said telephone control function; and calling said telephone control function in response to the command whose format is converted at said command format converting step to control a communication platform conformed to a standard interface of said telephone control function;

wherein said command of said format conformed to said telephone control function is not output to said analog line modem.

8. The computer readable memory as set forth in claim 7, wherein said command format converting step of said control program comprises the steps of:

upon receiving input of said control command output from said analog modem controlling means, checking existence/non-existence of a function equivalent to the function required by the control command among the functions provided by said telephone control function, and when the equivalent function exists, converting the format of the control command into that conformed to said telephone control function and sending the converted command to said function executing means.

* * * * *

UNITED STATES PATENT AND TRADEMARK OFFICE
CERTIFICATE OF CORRECTION

| | | |
|---|---|---|
| PATENT NO. | : 6,035,019 | Page 1 of 1 |
| APPLICATION NO. | : 08/881369 | |
| DATED | : March 7, 2000 | |
| INVENTOR(S) | : Minori Hara | |

It is certified that error appears in the above-identified patent and that said Letters Patent is hereby corrected as shown below:

Col. 7, line 25, after "telephony", insert --application programming interface and sends the converted command to said function executing means--.

Signed and Sealed this

Seventeenth Day of July, 2007

JON W. DUDAS
*Director of the United States Patent and Trademark Office*